United States Patent
Geissler et al.

(10) Patent No.: US 9,482,246 B2
(45) Date of Patent: Nov. 1, 2016

(54) HYDROSTATIC DRIVE

(75) Inventors: Grit Geissler, Ulm (DE); Karl-Heinz Vogl, Ummendorf (DE); Michael Frasch, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 506 days.

(21) Appl. No.: 13/876,713

(22) PCT Filed: Sep. 29, 2011

(86) PCT No.: PCT/EP2011/004861
§ 371 (c)(1),
(2), (4) Date: Jun. 5, 2013

(87) PCT Pub. No.: WO2012/041497
PCT Pub. Date: Apr. 5, 2012

(65) Prior Publication Data
US 2013/0318953 A1 Dec. 5, 2013

(30) Foreign Application Priority Data
Sep. 30, 2010 (DE) .......... 10 2010 047 194

(51) Int. Cl.
*F15B 15/20* (2006.01)
*B60K 11/00* (2006.01)
*B60K 25/04* (2006.01)

(52) U.S. Cl.
CPC .............. *F15B 15/20* (2013.01); *B60K 11/00* (2013.01); *B60K 25/04* (2013.01)

(58) Field of Classification Search
CPC .......... F16H 61/4035; F16H 61/4078; F16H 61/42; F16H 21/14; F15B 2211/62; F15B 1/022; F15B 1/024; F15B 2211/611; F15B 2211/613
See application file for complete search history.

(56) References Cited

U.S. PATENT DOCUMENTS

| | | | |
|---|---|---|---|
| 4,323,137 A | 4/1982 | Bando et al. | |
| 4,798,050 A * | 1/1989 | Nakamura | B62D 5/07 60/329 |
| 4,798,177 A * | 1/1989 | Oomura | F01P 7/044 123/41.02 |
| 6,311,488 B1 * | 11/2001 | Maruta | F01P 7/044 60/445 |
| 6,336,518 B1 * | 1/2002 | Matsuyama | 180/306 |
| 6,360,537 B1 * | 3/2002 | Widemann | 60/451 |
| 7,320,217 B2 * | 1/2008 | Yasuda et al. | 60/468 |

(Continued)

FOREIGN PATENT DOCUMENTS

| | | |
|---|---|---|
| DE | 35 41 446 A1 | 5/1987 |
| DE | 36 28 444 A1 | 8/1987 |

(Continued)

OTHER PUBLICATIONS

International Search Report corresponding to PCT Application No. PCT/EP2011/004861, mailed Mar. 29, 2012 (German and English language document) (5 pages).

*Primary Examiner* — John K Fristoe, Jr.
*Assistant Examiner* — Matthew Wiblin
(74) *Attorney, Agent, or Firm* — Maginot, Moore & Beck LLP

(57) ABSTRACT

A hydrostatic drive, especially a hydrostatic fan drive, includes a hydraulic constant-displacement pump configured to drive a hydraulic motor for a fan. The drive further includes a hydraulic machine configured to supply a second hydraulic circuit with a pressure medium. The constant-displacement pump is configured to be hydraulically combined with the hydraulic machine.

13 Claims, 1 Drawing Sheet

(56) References Cited

U.S. PATENT DOCUMENTS

| | | | |
|---|---|---|---|
| 7,392,823 B2* | 7/2008 | Dong et al. | 137/493.6 |
| 7,841,307 B2* | 11/2010 | Itoga | E02F 9/226 123/41.12 |
| 2003/0062212 A1 | 4/2003 | Samejima et al. | |
| 2007/0062186 A1* | 3/2007 | Wuthrich | F15B 21/047 60/488 |
| 2008/0110166 A1* | 5/2008 | Stephenson | E02F 9/2217 60/414 |
| 2008/0210500 A1* | 9/2008 | Walker | 188/151 R |

FOREIGN PATENT DOCUMENTS

| | | |
|---|---|---|
| DE | 38 38 404 A1 | 5/1990 |
| DE | 199 04 616 A1 | 8/2000 |

* cited by examiner

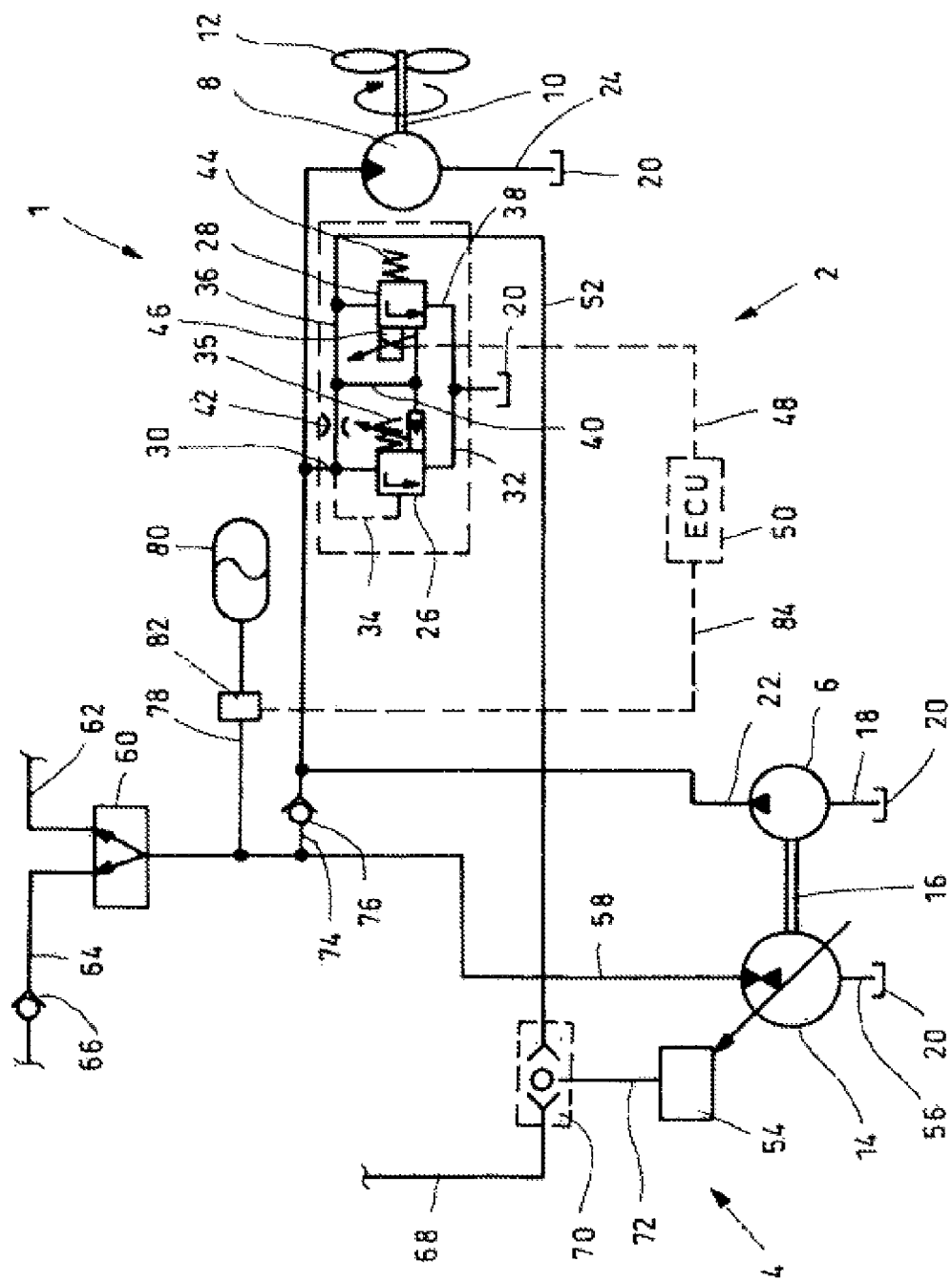

HYDROSTATIC DRIVE

This application is a 35 U.S.C. §371 National Stage Application of PCT/EP2011/004861, filed on Sep. 29, 2011, which claims the benefit of priority to Serial No. DE 10 2010 047 194.1, filed on Sep. 30, 2010 in Germany, the disclosures of which are incorporated herein by reference in their entirety.

BACKGROUND

The disclosure relates to a hydrostatic drive.

DE 38 38 404 A1 discloses such a drive for a fan. In this context, a constant-displacement pump hydraulically drives a constant-displacement motor which in turn serves to drive a fan. An electrically adjustable pressure-limiting valve is arranged as a bypass in parallel with the constant motor, as a result of which a rotational speed of the constant motor, and therefore of the fan, can be set.

Documents DE 35 41 446 A1 and DE 36 28 444 A1 likewise present a hydrostatic drive. A constant-displacement pump drives a constant-displacement motor as in the preceding document, wherein pressure medium can be made to bypass the constant-displacement motor by means of a pressure-limiting valve which is arranged in parallel with the constant-displacement motor. A further constant-displacement pump for supplying hydraulic consumers with pressure medium is driven together with the constant-displacement pump.

A disadvantage of the specific documents is that the pressure medium which flows away via the pressure-limiting valve flows back to the tank without being used, and therefore constitutes a waste of energy.

In contrast, the disclosure is based on the object of providing a hydrostatic drive with low energy wastage and low expenditure in terms of equipment.

SUMMARY

This object is achieved by means of a hydrostatic drive having the features of the disclosure.

According to the disclosure, a hydrostatic drive, in particular a hydrostatic fan drive, has a hydraulic constant-displacement pump for supplying a first hydraulic circuit with a pressure medium. In this context, the constant-displacement pump serves, in particular, for driving a hydraulic motor, in particular a constant-displacement motor for a fan, for example for cooling an engine. Furthermore, the drive has a hydraulic machine for supplying pressure medium to at least a second hydraulic circuit having at least one further hydraulic consumer. The constant-displacement pump can be combined hydraulically with the hydraulic machine here.

This solution has the advantage that, for example, if the constant-displacement pump delivers a constant volume flow of pressure medium and the first hydraulic circuit, in particular the constant-displacement motor, requires only a specific portion of this volume flow of pressure medium, the excess volume flow can, by virtue of the combination, serve to supply pressure medium to the second hydraulic circuit. Furthermore, it is conceivable that in the case of a combination the hydraulic machine drives, as a hydraulic motor, the constant-displacement pump when no pressure medium or only a small quantity of pressure medium is required in the second hydraulic circuit. As a result, the volume flow of pressure medium which is not required in the first circuit and is delivered by the constant-displacement pump leads at best to low energy losses, in contrast to the prior art explained at the beginning. Said volume flow serves for additionally supplying the second hydraulic circuit with pressure medium or for driving the constant-displacement pump.

The combination of the constant-displacement pump with the hydraulic machine is advantageously effected by combining the first circuit with the second circuit by means of a combination valve.

A non-return valve which opens in the direction of flow toward the second circuit and which is a component which is of simple design in terms of equipment and is extremely cost effective is particularly suitable as a combination valve.

In a further refinement of the disclosure, an adjustment device for setting a displacement volume of the hydraulic machine can be adjusted either as a function of the operating state in the first hydraulic circuit or as a function of a maximum load pressure of the consumers of the second hydraulic circuit. As a result, the hydraulic machine can be controlled not only as a function of the maximum load pressure but also as a function of the operating state in the first hydraulic circuit.

The adjustment device can be adjusted electrohydraulically here in such a way that the pressure at the pressure connection of the hydraulic machine corresponds to the necessary pressure in the first circuit. A pressure which is such that the corresponding pressure is set is preferably signaled from the first hydraulic circuit to the adjustment device of the hydraulic machine via a fluid line.

The pump pressure in the first hydraulic circuit is advantageously limited by means of a pilot-controlled pressure-limiting valve. The closing body of said valve is acted on in the closing direction by a closing pressure which can be set by means of an adjustable pilot control valve. The closing pressure is signaled here to the adjustment device of the hydraulic machine insofar as there is a specific relationship between the pump pressure desired in the first circuit and the maximum load pressure from the second circuit taking into account the setting of the pressure-limiting valve.

In order to store energy and recover energy, it is possible to connect, to the second hydraulic circuit, a hydraulic accumulator which, when a braking process occurs, can be charged by the hydraulic machine, which then operates as a pump, but in the case of a combination can also be charged by the constant-displacement pump.

The hydraulic accumulator is then advantageously controlled by means of an accumulator charge valve.

An electronic control unit can serve to set the closing pressure and to control the accumulator charge valve.

The constant-displacement pump and the hydraulic pump are driven at low cost in terms of equipment by means of a common driveshaft.

In order to use the hydraulic machine as a hydraulic pump and a hydraulic motor, said hydraulic machine is embodied as an adjustment pump with a continuously adjustable pivoting angle which is adjustable across a zero position.

Various advantageous developments of the disclosure are the subject matter of further dependent claims.

BRIEF DESCRIPTION OF THE DRAWING

In the text which follows, a preferred exemplary embodiment of the disclosure is explained in more detail with reference to a single drawing. The latter shows a block circuit diagram of an inventive hydrostatic drive according to an exemplary embodiment.

DETAILED DESCRIPTION

The single FIGURE shows a hydrostatic drive 1 having a first hydraulic circuit 2 and having a second hydraulic circuit 4. The first hydraulic circuit 2, illustrated on the right in the FIGURE, has a hydraulic machine which is embodied as a constant-displacement pump 6 and which serves to drive a further hydraulic machine which is embodied as a constant-displacement motor 8. A fan wheel 12, for example for cooling the engine, is driven by means of the constant-displacement engine 8 via a driveshaft 10. A supply of pressure medium to the second hydraulic circuit 4, illustrated on the left in the FIGURE, is provided via a hydraulic machine 14 which has an adjustable stroke volume, wherein said hydraulic machine 14 and the constant-displacement pump 6 are driven via a common shaft 16 by an engine (not illustrated), for example a diesel engine. The hydraulic machine 14 is embodied, in particular, as an axial piston machine with a swashplate which can be pivoted via zero, that is to say can operate either as a pump or as a motor in the same direction of rotation.

The constant-displacement pump 6 delivers pressure medium from a tank 20 via a tank line 18 into a pressure line 22 to which the constant-displacement motor 8 is connected. A pressure medium which is delivered by the constant-displacement pump 6 then flows back to the tank 20 via a discharge line 24 by means of the constant-displacement motor 8. In order to pressure-limit a pumping pressure in the pressure line 22, a pressure-limiting valve (PLV) 26 is provided, and is pilot-controlled by means of a pilot control valve 28. A pressure medium connection from a branch line 30, which branches off from the pressure line 22, and a tank line 32 which is connected to the tank 20 can be opened with the pressure-limiting valve 26. A closing body of the pressure-limiting valve 26 is acted on here by the pump pressure in the pressure line 22 in the opening direction via a control line 34 which is connected to the branch line 30. In the closing direction, the closing body is acted on by a spring force of an adjustable spring 35 and a pilot control pressure or closing pressure which can be set by the pilot control valve 28. The closing body of the pressure-limiting valve 26 is acted on with a force in the closing direction by the spring 35, which force is equivalent to a pressure of about 30 bar. This means that when the pressure-limiting valve is addressed via the control oil nozzle, a drop in pressure of 30 bar occurs, which drop determines, together with the throughflow cross section, the control oil flow flowing via the pilot control valve. The opening pressure in the control line 34 is therefore 30 bar higher than the closing pressure which is set at the pilot control valve 28 by means of the electromagnet 46.

The pilot control valve 28 is connected on the input side to a pilot control line 36 which branches off from the branch line 30. On the output side, the pilot control valve 28 is connected to a tank line 38 which is connected to the tank 20. Branching off from the pilot control line 36 is a control line 40 which serves, on the one hand, to hydraulically activate or apply the closing pressure to the closing body of the pressure-limiting valve 26 and, on the other hand, to apply the closing pressure in the opening direction to a closing body of the pilot control valve 28. Upstream of the control line 40 which branches off, a control oil nozzle 42 is arranged in the pilot control valve 36. Furthermore, the closing body of the pilot control valve 28 is acted on by a spring force in the closing direction by means of a spring 44. In the opening direction, the closing body can be acted on by an opening force, as well as by the pilot control pressure or closing pressure, by means of an electric actuator 46. The actuator 46 is connected via an electrical control line 48 to an electronic control unit (ECU) 50 and can be controlled thereby. The control pressure in the pilot control line 36 upstream of the control oil nozzle 42, and therefore in the control line 40, can be set by means of the pilot control valve 28. In turn, the opening pressure of the pressure-limiting valve 26, and therefore the maximum pump pressure, on which the rotational speed of the constant-displacement motor 8 and of the impeller wheel 12 driven thereby depends because of the impeller wheel characteristic curve, can be set by means of the closing pressure.

A signaling line 52, via which the control pressure is signaled to an adjustment device 54 of the hydraulic machine 14 of the second hydraulic circuit 4, is connected to the pilot control valve 36 downstream of the point where the control line 40 branches off from the pilot control line 36.

The hydraulic machine 14 is connected, on the one hand, to a tank line 56 connected to the tank 20, and, on the other hand, to a pressure line 58. The pressure line is connected via a priority valve 60 to a steering line 62 for a hydraulic steering system (not illustrated) and to a working line 64 in order to supply hydraulic consumers (not illustrated) with pressure medium. A non-return valve 66, which opens in the direction of flow of pressure medium away from the priority valve 60, is arranged in the working line 64.

A maximum load pressure of the consumers (not illustrated) or a load pressure of the hydraulic steering system (not illustrated) is signaled to the adjustment device 54 via a load signaling line 68. In order to signal to the adjustment device 54 either the load pressure in the load signaling line 68 or the closing pressure in the signaling line 52, depending on which pressure is the higher, a shuttle valve 70 is provided. In this context, the load signaling line 68 is connected to an inlet of the shuttle valve 70, the signaling line 52 is connected to the other inlet, and a connecting line 72, connecting to the adjustment device 54, is connected to the outlet. Such an adjustment device 54 is shown, for example, in DE 199 04 616 A1, wherein said adjustment device 54 is a delivery pressure flow regulator (DPFR) 54. The DPFR 54 causes a pressure to be set in the pressure line 58 which is above the pressure in the connecting line 72 by a pressure difference, for example 20 bar, which is equivalent to a force of a control spring arranged in the DPFR 54. This pressure difference is referred to as control delta p. The force of the spring 35 is equivalent to a pressure which is higher than the control delta p of the hydraulic machine 14, and is for example 10 bar above the control delta p, and is 30 bar.

According to the disclosure, the constant-displacement pump 6 can be combined hydraulically with the hydraulic machine 14. For this purpose, the pressure line 22 is connected to the pressure line 58 via a combination line 74. The latter is connected to the pressure line 58 between the hydraulic machine 14 and the priority valve 60. A combination valve, embodied as a non-return valve 76, is provided in the combination line 74. Said non-return valve 76 opens in a direction of flow of the pressure medium from the pressure line 22 of the first hydraulic circuit 2 to the pressure line 58 of the second hydraulic circuit 4.

As a result of the combination of the two hydraulic circuits 2 and 4 via the combination line 76, a volume flow of the pressure medium, which is not required to drive the hydraulic motor 8 after a predefined rotational speed of the impeller wheel dependent on the temperature of a coolant, out of the first hydraulic circuit can be used to additionally supply pressure medium in the second hydraulic circuit. This volume flow of pressure medium is not output to the tank 20 via the pressure-limiting valve 26, with the result that the wastage of energy such as occurs in the prior art explained at the beginning is avoided.

In the text which follows, the method of functioning of the drive 1 according to the disclosure is explained.

The closing pressure is signaled to the DPFR 54 via the signaling line 52 when the closing pressure is higher than the maximum load pressure of the activated hydraulic of the consumer of the second circuit 4. As a result, either the closing pressure or a relatively high load pressure is signaled from the load-signaling line 68 via the connecting line 72 to the DPFR 54. The displacement volume of the hydraulic machine 14 is set by means of the DPFR 54 in such a way that a working pressure in the pressure line 58 is above the signaled pressure by an amount equal to the control delta p. The working pressure in the pressure line 58 is therefore lower than the pressure in the pressure line 22 when the maximum load pressure of the hydraulic consumers of the circuit 4 plus the control delta p is lower than the closing pressure plus a pressure which is equivalent to the force of the spring 35. The volume flow of pressure medium of the first hydraulic circuit 2 which is not required is then delivered into the pressure line 58 of the second hydraulic circuit 4 by the constant-displacement pump 6 via the combination valve 76. This additional volume flow of pressure medium in the pressure line 58 can serve to supply the hydraulic consumers of the circuit 4 with pressure medium, as a result of which the hydraulic machine 14 swings out to a smaller degree. If these consumers do not require any power, the excess volume flow of the constant-displacement pump 6 flows back to the tank via the non-return valve 76 and the adjustable hydraulic machine 14. The hydraulic machine 14 swings above zero in this case and drives, as a hydraulic motor, the constant pump 6. The motor driving the constant-displacement pump 6 is relieved by the hydraulic machine 14 which is used as a hydraulic motor.

In the two cases indicated, in which no power is extracted from the consumers of the circuit 4 or the load pressure is low, it is possible to set, at the pilot control valve 28 by corresponding actuation of the electromagnet 46, a control pressure which is such that a pressure which is necessary for the desired rotational speed of the impeller wheel is present in the lines 22 and 58. The control pressure is then lower than the necessary pressure in the lines 22 and 58 only by an amount equal to the control delta p of the hydraulic machine 14. The pressure-limiting valve 26 is closed in this context and constitutes only a pressure protection means. There is a leakage flow via the pilot control valve through the control delta p and through the throughflow cross-section of the control oil nozzle 42.

If the sum of the maximum load pressure of the hydraulic consumers of the circuit 4 plus the control delta p is higher than the closing pressure plus a pressure which is equivalent to the force of the spring 35, the working pressure in the pressure line 58 is higher than the pump pressure in the pressure line 22, and the non-return valve 76 is closed, as a result of which the combination of the constant-displacement pump 6 with the hydraulic machine 14 is interrupted. In this case, the excess volume flow of the constant-displacement pump 6 flows away via the pressure-limiting valve 26 and the pilot control valve 28.

In order to store energy, a hydraulic accumulator 80 is connected to the pressure line 58 between the priority valve 60 and the connection of the combination line 74 via an accumulator line 78. Said hydraulic accumulator 80 can be charged in an operating mode of the vehicle which is equipped with the hydrostatic drive according to the disclosure. A pressure medium inflow and outflow to the hydraulic accumulator 80 is controlled by means of an accumulator charge valve 82 arranged in the accumulator line 78. The accumulator charge valve 82 is connected to the ECU 50 via an electric control line 84. The consumers of the circuit 4 or the hydraulic machine 14, which then operates as a hydraulic motor, can be supplied with pressure medium from the hydraulic accumulator 80 up to a predefined state of charge of the hydraulic accumulator. The hydraulic machine 14 can then be used to drive the constant-displacement pump 6 or to drive the vehicle, in particular during acceleration processes.

A hydrostatic drive, in particular a hydrostatic fan drive, is disclosed having a hydraulic constant-displacement pump via which, for example, a hydraulic motor for a fan is driven. Furthermore, the drive has a hydraulic machine for supplying a second hydraulic circuit with pressure medium. The constant-displacement pump can be combined hydraulically with the hydraulic machine here.

LIST OF REFERENCE NUMBERS

1 Drive
2 First circuit
4 Second circuit
6 Constant-displacement pump
8 Constant-displacement motor
10 Driveshaft
12 Impeller wheel
14 Hydraulic machine
16 Shaft
18 Tank line
20 Tank
22 Pressure line
24 Outflow line
26 Pressure-limiting valve (PLV)
28 Pilot control valve
30 Branch line
32 Tank line
34 Control line
35 Spring
36 Pilot control line
38 Tank line
40 Control line
42 Control oil nozzle
44 Spring
46 Actuator
48 Control line
50 ECU
52 Signaling line
54 Adjustment device/DPFR
56 Tank line
58 Pressure line
60 Priority valve
62 Steering line
64 Working line
66 Non-return valve
68 Load-signaling line
70 Shuttle valve
72 Connecting line
74 Combination line
76 Combination valve/non-return valve
78 Accumulator line
80 Hydraulic accumulator
82 Accumulator charge valve
84 Control line

The invention claimed is:

1. A hydrostatic drive, comprising:
   a first hydraulic circuit that includes:
      a hydraulic motor;
      a constant-displacement pump configured to supply the first hydraulic circuit with pressure medium to drive the hydraulic motor;
      a pilot-controlled pressure-limiting valve configured to limit a pressure in the first hydraulic circuit, the pilot-controlled pressure-limiting valve including a closing body; and
      an adjustable pilot control valve configured to set a closing pressure that acts on the closing body of the pilot-controlled pressure-limiting valve in a closing direction;
   a second hydraulic circuit that includes:
      at least one hydraulic consumer separate from the hydraulic motor; and
      a hydraulic machine configured to supply only the second hydraulic circuit with pressure medium to drive the at least one hydraulic consumer; and
   an adjustment device configured to set a displacement volume of the hydraulic machine of the second hydraulic circuit, the displacement volume adjusted as a function of an operating state of the first hydraulic circuit, and a greater of a maximum load pressure of the at least one hydraulic consumer and the closing pressure,
   wherein the constant-displacement pump is further configured to be combined hydraulically with the hydraulic machine to at least partially drive the at least one hydraulic consumer.

2. The hydrostatic drive as claimed in claim 1, wherein the first circuit is configured to be connected via a combination valve to the second circuit so as to combine the constant-displacement pump with the hydraulic machine.

3. The hydrostatic drive as claimed in claim 2, wherein the combination valve is a non-return valve which opens in the direction of flow to the second circuit.

4. The hydrostatic drive as claimed in claim 1, wherein the adjustment device of the hydraulic machine is set in such a way that a pressure at a pressure connection of the hydraulic machine corresponds to a pressure in the first hydraulic circuit sufficient to drive the hydraulic motor at a desired rate.

5. The hydrostatic drive as claimed in claim 1, wherein:
   a hydraulic accumulator is connected to the second hydraulic circuit,
   the hydraulic accumulator is controlled by an accumulator charge valve, and
   one or more of the pilot control valve and the accumulator charge valve are controlled by an electronic control unit.

6. The hydrostatic drive as claimed in claim 1, further comprising:
   a shuttle valve configured to signal a greater of the maximum load pressure of the at least one hydraulic consumer and the closing pressure of the pilot-controlled pressure-limiting valve to the adjustment device.

7. The hydrostatic drive as claimed in claim 4, wherein the closing pressure of the adjustable pilot control valve is signaled from the first hydraulic circuit to the adjustment device.

8. The hydrostatic drive as claimed in claim 1, wherein, in the case of a combination, the constant-displacement pump is configured to be driven mechanically by the hydraulic machine which is operated as a hydraulic motor.

9. The hydrostatic drive as claimed in claim 1, wherein a hydraulic accumulator is connected to the second hydraulic circuit.

10. The hydrostatic drive as claimed in claim 9, wherein the hydraulic accumulator is controlled by an accumulator charge valve.

11. The hydrostatic drive as claimed in claim 1, wherein the constant-displacement pump and the hydraulic machine are mechanically connected to one another via a common driveshaft.

12. The hydrostatic drive as claimed in claim 1, wherein the hydraulic machine is an adjustment machine with a stroke volume that is continuously adjustable from zero in a first direction and in a second direction opposite to the first direction.

13. The hydrostatic drive as claimed in claim 1, wherein the hydraulic motor is for a fan, and wherein the hydraulic machine is further configured to supply the at least one hydraulic consumer with pressure medium.

* * * * *